(12) United States Patent
Lau

(10) Patent No.: US 8,874,101 B2
(45) Date of Patent: Oct. 28, 2014

(54) FEASIBILITY, CONVERGENCE, AND OPTIMIZATION OF LTE FEMTO NETWORKS

(75) Inventor: Richard Lau, Morganville, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 303 days.

(21) Appl. No.: 12/984,276

(22) Filed: Jan. 4, 2011

(65) Prior Publication Data

US 2012/0009909 A1 Jan. 12, 2012

Related U.S. Application Data

(60) Provisional application No. 61/292,000, filed on Jan. 4, 2010, provisional application No. 61/345,702, filed on May 18, 2010.

(51) Int. Cl.
| | |
|---|---|
| H04W 24/00 | (2009.01) |
| H04W 52/26 | (2009.01) |
| H04W 52/24 | (2009.01) |
| H04W 52/14 | (2009.01) |

(52) U.S. Cl.
CPC .......... *H04W 52/244* (2013.01); *H04W 52/265* (2013.01); *H04W 52/143* (2013.01)
USPC ......................................... 455/423; 455/522

(58) Field of Classification Search
CPC ...... H04W 24/00; H04W 24/08; H04W 16/18
USPC .................................. 455/423, 522
See application file for complete search history.

(56) References Cited

U.S. PATENT DOCUMENTS

| | | | |
|---|---|---|---|
| 8,126,496 B2* | 2/2012 | Brisebois et al. ............. | 455/522 |
| 2009/0098890 A1 | 4/2009 | Vasudevan et al. | |
| 2009/0137241 A1* | 5/2009 | Yavuz et al. .................. | 455/423 |
| 2009/0197590 A1* | 8/2009 | Borran et al. ................. | 455/423 |
| 2009/0280853 A1 | 11/2009 | Brisebois et al. | |

FOREIGN PATENT DOCUMENTS

WO 2009120689 A2 10/2009

OTHER PUBLICATIONS

Li, Xiangfang et al., "Downlink Power Control in Co-Channel Macrocell Femtocell Overlay," 43rd Annual Conference on Information Sciences and Systems, Mar. 18-20, 2009, pp. 383-388, Baltimore, MD.
Patent Cooperation Treaty International Search Report, Apr. 27, 2011.

\* cited by examiner

*Primary Examiner* — William D Cumming

(57) ABSTRACT

Methods and systems used to plan, optimize, and manage LTE femtocell networks describes an analytical framework and algorithms that allow analysis and planning of various femtocell aspects including dynamic adjustment of femtocell power for interference mitigation, and optimization according to user selectable policies. The framework recommends using a hybrid of both distributed control and centralized policy enforcement. An algorithm having two closely related aspects is provided. The first part is an Iterative and Distributed Algorithm (IDA), which is intended to be executed inside the femtocells. The second part of the algorithm is intended to be used as a toolset and is called Analytic Computational Algorithm (ACA), which is intended to be used in a centralized planning and operations center. The ACA provides a set of conditions that are used to check for convergence of the IDA.

9 Claims, 6 Drawing Sheets

FEASIBILITY, CONVERGENCE, AND OPTIMIZATION OF LTE FEMTO NETWORKS

CROSS-REFERENCE TO RELATED APPLICATIONS

This application claims the benefit of U.S. Provisional Application No. 61/292,000, filed on Jan. 4, 2010 and U.S. Provisional Application No. 61/345,702, filed on May 18, 2010, both of which are incorporated by reference herein in their entirety.

FIELD OF THE INVENTION

The present invention relates to Long Term Evolution (LTE) femtocells, and specifically to an analytical framework and algorithms that allow analysis and planning of various femtocell aspects including dynamic adjustment of femtocell power for interference mitigation, and optimization according to user selectable policies. Quite specifically, a hybrid distributed and centralized femtocell planning and optimization algorithm provides guarantees for convergence and optimization with respect to user selected QoS.

BACKGROUND OF THE INVENTION

Long Term Evolution (LTE) femtocells are also called Home enhanced Node B (HeNB) in 3GPP terminology. They are miniature base stations intended to cover a small area in the order of 75 feet by 75 feet. From appearance, they look like a WiFi Access Point (AP) and are intended to be used just like an access point. For residential deployment, the femtocell is connected to a wire line broadband network in a similar fashion as the WiFi AP. The major difference is that femtocells normally operate in the cellular licensed spectrum while WiFi APs use the unlicensed spectrum. The immediate implications are first, femtocell service is a managed service whose providers are usually cellular operators, while WiFi services are best effort. Second, from the user perspective, the same cellular device (e.g. smart phone) that customers are using in the outdoor environment is also used inside the femto area, which is normally an indoor environment. Finally, femtocell performance is expected to be better than that of the macrocell environment due to the proximity of the femto base station to the user equipment and the generally higher capacity of the residential broadband network as the backhaul.

Femtocells are associated with different technologies: 2G (GSM, CDMA), 3G (UMTS, HSPA, and EVDO), and 4G (LTE, WiMAX). Currently in the United States, 3 out of the 4 largest cellular carriers have commercial deployment of either 2G or 3G femtocells. There are also many trials of femtocell service since 2008. ABI Research estimated that there are 60 trials of femtocell services at the end of 2009 over the world. While commercial trials of LTE femtocell have not been announced, there are a number of laboratory demonstrations. Moreover, many analysts have commented that the impact of LTE femtocell is expected to be even larger than those of the earlier generations. This is because while the 2G/3G femto introduction can be considered to be an afterthought, LTE femtocell is expected to be an integrated part of the LTE rollout planning.

While there is much promise about the femtocell idea, operators are still hesitating about large scale deployment. One of the concerns is that femtocells are expected to be deployed in the tens of thousands and all have to be managed smoothly without large operations cost. In particular, because of the uncertainty of femto locations and their potential proximity to each other as well as to the macrocell, interference can severely compromise femto performance. Moreover, malfunctioning or mistuned femtocells can further degrade the performance of the LTE macro network. All these concerns lead operators to focus on a new concept called Self-Organizing Networks (SON) as a long term solution, especially for operations. SON represents aggregated ideas that include "self-optimization", "self-configuration", and "self-healing". These self-X capabilities are becoming integrated parts of the new 4G LTE network. The state of the art in various self-X technologies is still at their infancy.

The present invention proposes a framework targeted towards solving the management of large scale femtocell networks. A key feature of the invention is that while the optimization procedure involves only local femtocells without explicit coordination with other femtocells, there is a centralized counterpart of the localized algorithm, which oversees the global performance and sets policy and associated parameters. The proposed hybrid architecture ensures scalability, and provides better global control and assurance towards managing thousands of femtocells. In addition, the proposed framework and algorithms are general and can be applied to various radio technologies, including UMTS, WiMAX, and LTE. However, because of the importance of LTE and the associated OFDM technology, the following description will focus on using LTE to illustrate the invention.

SUMMARY OF THE INVENTION

LTE femtocell is a new idea in 4G wireless. Since large scale LTE femtocells are not commercially deployed, there are little publicly known solutions. Two general prior solutions are described in the literature. First, different chunks of OFDM frequencies are assigned to neighboring femtocells to avoid interference. This method is similar to that of frequency planning in traditional wireless networks. For example, frequency reuse factors of 3, 7, and 11 are common in GSM networks. However, this approach is not effective for LTE femtocells as the femtocells do not have predefined locations. Moreover, assigning preallocating OFDM frequency will underutilize the available resource. The second method is to adjust the power of each femtocell according to local measurements. However, there are not reported methods of how to properly adjust all the femtocells so that convergence is assured.

Prior solution usually provides some ad hoc method for femtocell power adjustment. There are no reported mechanisms to detect if the power selected will converge or not. Worse yet, in some anomaly situations, there are no guarantees that the selected power does not cause adverse effects to other femtocells or degrade the performance of a large area of the macrocell network.

Other solutions suggest assigning different frequency to the femtocells to reduce interference among femtocells. This is similar to using frequency reuse factor larger than 1 as commonly used in GSM macrocell networks. However, it can be shown that without adaptive power of femtocells, using frequency reuse factor larger than 1 will significantly reduce femto UE rate. If frequency reuse is combined with the power adaptation as proposed in the current invention, it can be shown that the overall performance is similar. Therefore frequency reuse applied to femtocells does not improve performance, but will increase complexity as locations of femtocells cannot be known before deployment and they may change during deployment. For these reasons, using power adaptation as proposed in this invention is superior than using methods that use frequency reuse factors larger than 1.

The femtocell-macrocell interference reference architecture is shown in FIG. 1. Femtocells are made up of 3 components, femto access point (FAP) 102, Home User Equipment (HUE) 104, and the femto area 106. Several types of interaction or interference between femtocells and between femtocells and macrocell are also illustrated in FIG. 1. First, an HUE can be interfered by neighboring femtocells. Second, HUE can be interfered by the nearby macro tower 108. Finally, FAPs also interfere with the Macro User Equipment (MUE) 110. All the interference can occur in both the uplink and downlink direction. Femtocells are expected to be adjacent to multiple femtocells. A group of femtocells (called cluster) usually co-locate in an area of a macrocell.

Given a number of femtocells and one or more macrocells located in a given area, and several Home UEs are supported within each femto area of radius r, the problems to be solved are: How can each femtocell adapt its power to achieve the best performance of the HUES and at the same time incur the minimum inference to the MUEs?

Suppose each femtocell i can dynamically change its output power Pi within a given range. The optimization problem is to find a set of values for Pi such that certain selected criteria discussed below can be met. It is assumed that all femtocells and macrocells may use all the frequencies (resource blocks) of the assigned LTE spectrum, thus a single frequency reuse scheme is assumed.

The present invention solves three types of problems using optimization techniques. First, if each femtocell makes its decision without explicit coordination with its neighboring femtocells or the macrocell, how should the femtocell be controlled to satisfy global objectives? Second, what kind of objective functions will provide a good linkage between desired policies and adjustable parameters of the proposed framework? Third, how can various QoS levels be satisfied? What are the tradeoffs and how to support administrative control of the tradeoffs?

The present invention provides a hybrid distributed and centralized femtocell planning and optimization algorithm that provides guarantees for convergence and optimization with respect to user selected QoS.

The present invention comprises two algorithms, an Interative Distributed Algorithm (IDA) and an Analytic Computational Algorithm (ACA). The IDA is distributively implemented by the femtocells and ACA works at a centralized location. The novelty of the invention is that the proposed IDA is controlled by the ACA, which is able to create parameters for convergence, optimization, and provides tradeoffs. Also, because the equivalence of the solution of IDA and ACA. It is possible to use ACA as a virtualization of the complex and often elusive solution to IDA.

Most algorithms in the prior art are ad-hoc with no proof of convergence. The algorithms of the invention approach the problem from two completely difference angles but the two approaches arrive at the same solution. Each different algorithm is suitable for its own applications. It will be shown below that by use of the ACA, convergence of the IDA is guaranteed. The critical parameters and the conditions of convergence are described below.

The invention will be better understood when the following description is read in conjunction with the accompanying drawings.

DETAILED DESCRIPTION

Figure 1:
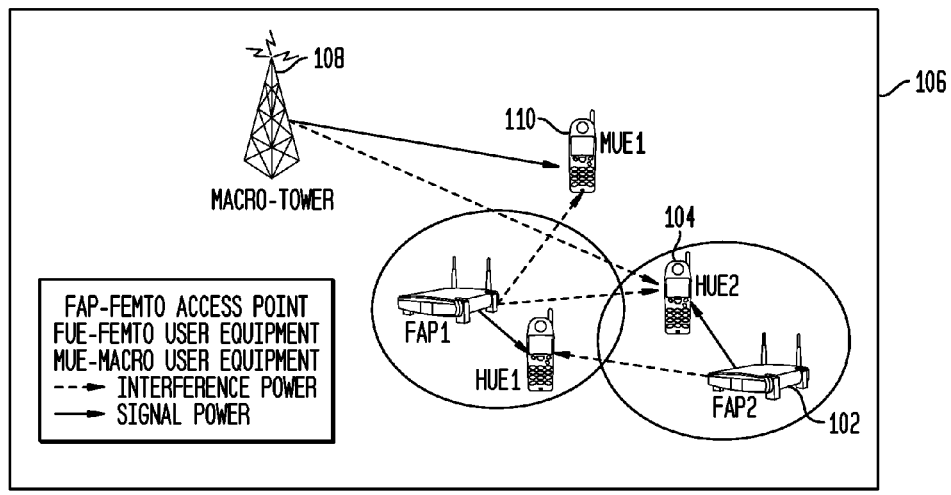
FIG. 1 shows a femtocell-macrocell interference reference architecture.

There are in general two types of optimization approaches: a) Centralized; and b) Distributed. In a centralized approach, the optimization algorithm is executed in an entity outside the femtocells. States of the femtocells are monitored and data are sent back to the centralized entity for optimization. The centralized entity may perform policy setting as well as optimization, but the frequency of adjustments is usually relatively low. The advantage is that the centralized entity has a better view of the femto network and may be able to provide a globally optimized solution. However, centralized optimization takes longer to execute and requires more coordination between femtocells and the optimizer. This may cause a scaling problem when the number of femtocells is very large. In the distributed approach, decision and power adjustment is made locally at each femtocell, using information it collects regarding to the status or effect of its neighboring femtocells, such as received power or interference measurements. High-level guidance from an external policy server may be used to provide the optimization target. Each femtocell performs its own adjustment and convergence depends on proper selection of policy and algorithm. The advantage of the distributed approach is that it has the potential of better control of the scaling problem when the number of femtocells becomes very large, as each femtocell only needs to make its own decision. The risk is that if convergence is not achieved, it may end up with a bad operating point. There is also the issue of stability if a femtocell malfunctions and causes undesirable propagating effect. The present invention focuses on solving the distributed approach optimization problem. In addition, a centralized planning and optimization algorithm is used to issue high level guidance to enforce global policy. The two approaches can be described by the same mathematical framework.

The inventive approach can be considered as a hybrid approach in which femtocells execute local rules but under the direction of centralized policy servers. Such an approach is not described in the literature.

The femto-macro interference optimization problem can be described in mathematical terms. We start with defining the objective attributes and the control parameters. While there are many variations of the objective function, they can be categorized as combination of the following criteria:
  Increase the capacity of femto UE within the femto reference area. Variations may involve:
    maximize the minimum bit rate
    maximize the average bit rate
    minimize the standard deviation subject to certain minimum average bit rate
    optimize weighted combination of the above Increase the capacity of Macro UE in the predefined macro reference area.
  maximize the minimum bit rate
  maximize the average bit rate
  minimize the standard deviation subject to certain minimum average bit rate
  optimize weighted combination of the above
Jointly optimize the capacity of both femto and macro UE
  Optimize HUE capacity subject to minimum MUE capacity
  Optimize MUE subject to minimum HUE capacity
Reduction of dead zone area for MUE. Dead zone is the area where there is no Macro cell service These criteria are not exhaustive but are rather merely illustrative of the criteria that may be used. One can easily define other statistical properties (e.g. 95% percentile) as components of forming a utility function for global optimization. The goal of the invention is to create an optimization framework in which variations such as introducing new statistical criteria can easily be accommodated.

We will focus on solving three types of problems using optimization techniques. First, if each femto cell makes its decision without explicit coordination with its neighboring femtos or the macro cell, how should the femto cell select the criteria attributes to satisfy global optimization objectives? What kind of algorithm will work, and how well does it work? Second, how does an operator use the optimization framework to solve specific interference problems, such as femto-femto interference, or femto-macro interference? Third, how do various QoS levels be satisfied with respect to the proposed optimization framework? What are the tradeoffs and how to support user control of the tradeoffs? These questions and their answers will be described below. In the following we create an analytical framework as part of the problem formulation.

Figure 2:
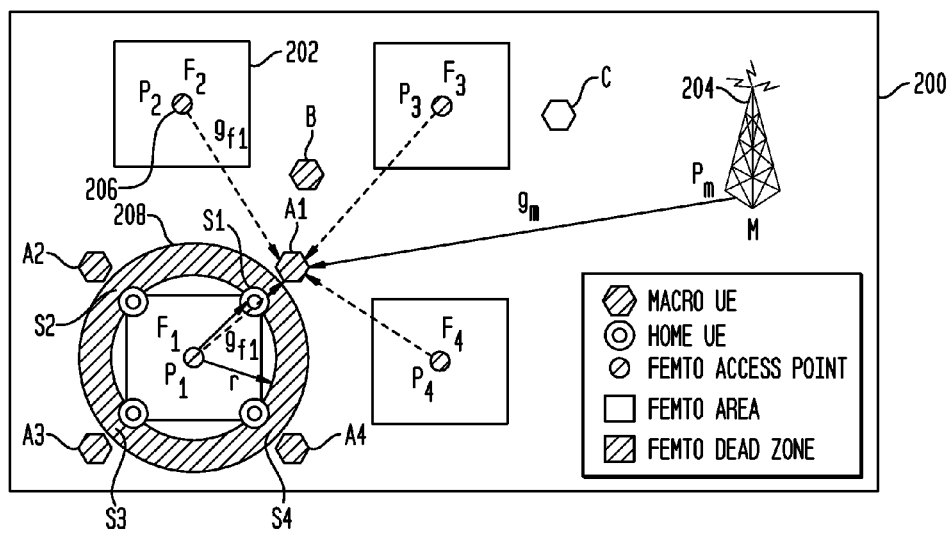
FIG. 2 shows a femto optimization formulation.

FIG. 2 shows a mathematical framework 200 corresponding to the architecture of FIG. 1. In FIG. 2, 4 femtocells (Fi) 202 and a macrocell (M) 204 are used for illustration. The femto area is illustrated as the circle 206 around the FAP. The femto area is described by a path loss model different from that of the macrocell. A ring area (shaded) 208 outside the femto area where there is no MUE service is called the dead zone area.

The analysis presented below applies to any number of femtocells and macrocells. For a femtocell i, the expression for the Signal-to-interference-and-noise (SINR$_f$) of a Home UE (HUE) located at a spot si, i=1, . . . , 4, and the SINR$_m$ of a Macro UE located at a spot A$_i$, i=1 . . . 4 is as follows:

$$SINR_f(i) = \frac{P_i g_{fi}}{\sum_{j=1, i \ne j}^{N} P_j g_{ji} + P_m g_{mil} + N_t} \quad \text{(eq. 1)}$$

$$SINR_m(i) = \frac{P_m g_{mio}}{\sum_{j=1, i \ne j}^{N} P_j g_{ji} + P_i g_{fi} + N_t} \quad \text{(eq. 2)}$$

Equations 1 and 2 are written in linear terms, i.e. not in dB. The numerators on the right hand side are the received power and the denominators are the total interference power at spot s$_i$ and A$_i$ respectively. The P's are the power at the source, the g's are the path gain (1/path loss), the subscripts i, j signify femto i and all the neighboring femto cells j respectively, subscript m is for the macro cell source, and N$_t$ for noise power of the spectrum corresponding to one physical resource block's bandwidth of N$_{sc}^{RB}$ resource elements.

For indoor path model, we adopt the micro-urban model given by:

$$L_{femto}(dB) = 28 + 40 \log_{10}(d) - \text{gain\_femto} \quad \text{(eq. 3)}$$

where d is in meters and gain_femto is the combined gain of femto transmitter and receiver, and is set to 0 dBi for the rest of the description.

For outdoor path loss, using the pass loss (L$_m$), for urban environment at a spectral frequency of 2 GHz, we have, $$L_m(dB) = 128.1 + 37.6 \log_{10}(d_{km}) + L_{sh} - G_m \quad \text{(eq. 4a)}$$

where d$_{km}$ is the distance between the transmitter and the receiver in km, L$_{sh}$ is log-normally distributed shadowing, which is set to be 10 dB for simulation, and G$_m$ is the gain of the antenna (set to 15 dBi). When an outdoor source is to penetrate an indoor building, we add another factor to represent the in-building loss, so that, $$L_{mi}(dB) = 128.1 + 37.6 \log_{10}(d_{km}) + L_{sh} - G_m + W \quad \text{(eq. 4b)}$$

where W is the penetration loss, a typical value is 20-40 dB. Noise N$_t$ for LTE is given as:

$$N_t = (-174 + 10 * \log_{10}(BW/nRB) + NF) \quad \text{(eq. 5)}$$

where BW is the total spectrum of the LTE service, and nRB is the number of resource block bandwidth and NF is the noise figure. For a 10 MHz bandwidth, nRB is 25, we have, in dB, $$N_t = (-174 + 10 * \log_{10}(1 \times 10^7/25) + 9) \quad \text{(eq. 6)}$$

We formulate femto-macro interference as a constrained optimization problem. The constraints are given by the number of femtocells in a cluster, maximum power of each femtocell, locations of interest, desirable capacities of HUE and MUE, and various QoS aspects. This approach is to allow each femtocell to independently adjust its power level so that all the above constraints are satisfied. If a given set of constraints cannot be all satisfied, the algorithm will relax certain parameters and therefore the constraints, to search for a feasible solution.

Distributed Optimization

In the distributed optimization approach, each femto cell implements an algorithm for optimization or for the purpose of achieving some specific goals. Optimization usually involves tradeoffs among a number of desirable attributes. For example, it is desirable to increase the capacity of a HUE within a femto area of 25 m², but it is also desirable not to interfere "too much" the neighbor's femto area. In addition, one also does not want to create too much interference to a MUE outside the femto area. Optimization thus allows the adjustment of the power of the femto cells in such a way that criteria such as these can be satisfied. Sometimes, it may not be possible to satisfy all the desired criteria. In such cases, the criteria will need to be relaxed, or optimization will try to find the best solution, according to certain criteria. These criteria are related to some higher level conditions, which are usually captured in the form of a policy.

The following lists a number of relevant parameters:
  Power of the femto transmitter
  Power of macro transmitter
  Femto area of concern
  Dead zone where there is no macro signal
  Macro area of concern
  Desired bit rates of femto areas of concern
  Desired bit rates of macro areas of concern
  Locations of femto cells
  Locations of macro cells
  Path models for indoor and outdoor The list is not exhaustive of all relevant parameters but it is merely descriptive of some relevant parameters Optimization Conditions We need to define where the HUE for computing $SNR_f$ is and where is the MUE for computing $SNR_m$. As a starting point, use s1-s4 for HUE and the corresponding locations A1-A4 for the MUE as illustrated in FIG. 2. Other positions (such as location B of FIG. 2) can also be defined, depending on the type of problem to be solved or the particular policy to be enforced.

We first examine the fundamental constraints of the system. Next, suppose we have N femto cells and one macro cell. It can easily be extended to multiple macro cells scenario. Suppose it is desirable to achieve a target $SNR_f$ as $T_f$ and a target $SNR_m$ as $T_m$ (linear term, not dB). Using equation 1 and equation 2, we obtain following expressions for $SNR_f$ for a HUE, and $SNR_m$ for a MUE, $$SINR_f(i) = \frac{P_i g_{fi}}{\sum_{j=1, i \neq j}^{N} P_j g_{ji} + P_m g_{mil} + N_t} \geq T_f \qquad \text{(eq. 7)}$$

$$SINR_m(i) = \frac{P_m g_{miO}}{\sum_{j=2, i \neq j}^{N} P_j g_{ji} + P_i g_{fi} + N_t} \geq T_m \qquad \text{(eq. 8)}$$

Solving for $P_i$, and designating the lower bound of $P_i$ as $P_{min}$, we can derive the following power constraint for the femto:

$$P_i \geq \frac{T_f}{g_{fi}} \cdot \left( \sum_{j=1, i \neq j}^{N} P_j g_{ji} + P_m g_{mil} + N_t \right) \triangleq P_{min}(i) \qquad \text{(eq. 9)}$$

Equation 9 says that in order to achieve the target $SNR_f$ for a HUE within a femto area, the power level of that femto needs to be set to be larger than $P_{min}$.

Similarly, solving for $P_i$ of equation 8, and designating the upper bound of $P_i$ as $P_{max}$, we derive the following power constraint for the femto:

$$P_i \leq \frac{1}{g_{fi}} \cdot \left( \frac{P_m g_{miO}}{T_m} - \sum_{j=1, i \neq j}^{N} P_j g'_{ji} - N_t \right) \triangleq P_{max}(i) \qquad \text{(eq. 10)}$$

Equation 10 says that in order to meet the criteria that a MUE has a target $SNR_m$ of at least $T_m$, the power of the femto cell must be less than $P_{max}$. Note that equation 10 and equation 9 have already taken into account the total interference due to the neighboring femto cells as well as that of the macro cell. However, there is an additional constraint of, $$P_i \geq 0 \qquad \text{(eq. 11)}$$

Objective Functions

There are various objective functions that can be used. For example, one can optimize the total capacity (V) of all the femtocells, while requiring the MUE rates ($w_i$) to satisfy some minimum rate ($w_m$) constraint, so that, if $v_j$ is the rate of the jth femtocell, we have, $$V = \Sigma_{j=1}^{N} v_j \text{ subject to } w_i > w_m \text{ for } all \ i \qquad \text{(eq. 12)}$$

In general, V is a nonlinear function of the power, which complicates optimization. We propose to use the following intermediate objective function:

$$P_i = \alpha P_{min}(i) + (1-\alpha) P_{max}(i) \text{ for all } i \qquad \text{(eq. 13)}$$

Equation 13 suggests that each $P_i$ is a linear combination of the minimum and maximum power constraint demanded by equation 9 and equation 10. The parameter $\alpha$ is between 0 and 1 and it is important in few aspects. First, $\alpha$ allocates resource between the femto and macro network. When $\alpha$ approaches 0, the selected femto power approaches Pmax(i), thus providing more resource (in terms of SINR) to the femto network. Conversely, if $\alpha$ approaches 1, the selected power approaches Pmin(i), thereby allocating more resource to the macro network. Thus by setting a proper value for $\alpha$, it is possible to set global QoS policy for all the femtocells. Second, by searching the entire $\alpha$ space, one can find the solution to the objective function given by equation 12. Finally, it will be shown below that equation 13 leads to a mathematical framework that can be used to formulate an analytical solution to the optimization problem.

To gain more insight into the significance of $\alpha$, we will illustrate the relationship between the $\alpha$-space and the feasibility region given by equation 9-equation 11. Here we use a simple 2 femto nodes, shown in FIG. 3, scenario to illustrate the idea.

Figure 3:
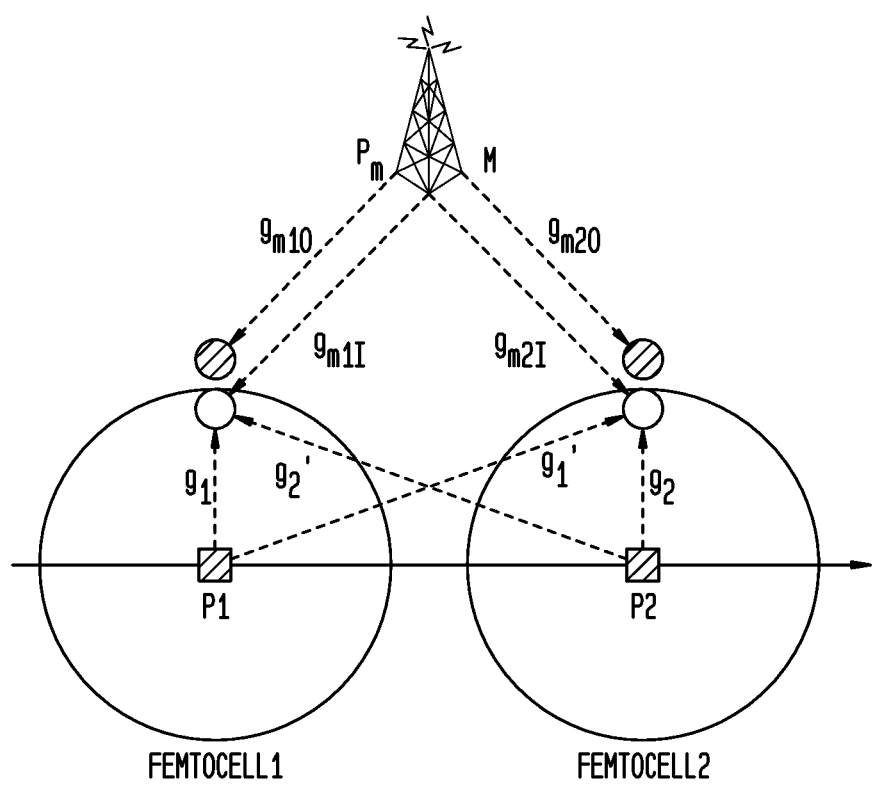
FIG. 3 illustrates the interference scenario of 2 femtocells.

With respect to the simple 2-femtocell network of FIG. 3, we can write down the corresponding constraints as required by eq. 9-eq. 11, for both femtocell 1 and femtocell 2, resulting in four inequalities (neglecting the noise tem) given by, For femtocell 1:

$$P_1 \geq \left( \frac{T_f}{g_2} \right)(P_2 g'_2 + P_m g_{m1I}) \qquad \text{(eq. 14)}$$

$$P_1 \leq \left( \frac{1}{g_1} \right)(P_m g_{m1O} / T_m - P_2 g'_2) \qquad \text{(eq. 15)}$$

For femtocell 2:

FIG. 3. Interference scenario of 2 femtocells femtocell1 for femtocell 1: ≥( )('+)≤( )/−') for femtocell 2:     (14) (15)

≥( )('+)≤( )(/−')     (16) (17)

$$P_2 \geq \left( \frac{T_f}{g_2} \right)(P_1 g'_1 + P_m g_{m2I}) \qquad \text{(eq. 16)}$$

$$P_2 \leq \left( \frac{1}{g_2} \right)(P_m g_{m2O} / T_m - P'_1 g'_1) \qquad \text{(eq. 17)}$$

Note that $g_{mxI}$, $g_{mxO}$, x=1, 2 refer to the path gains with respect to a reference location just inside and outside the femtocell respectively. A typical feasible region given by these 4 constraint equations is shown in FIG. 4.

Figure 4:
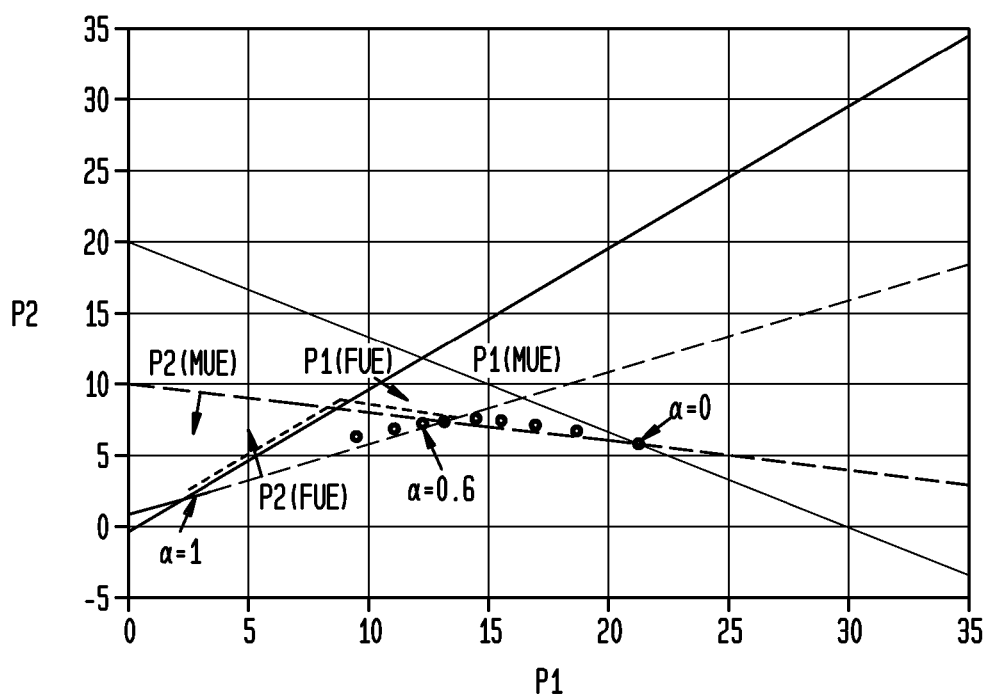
FIG. 4 is a graphical representation of feasibility region and converged points for different α's.

From FIG. 4, we can see that the feasible region forms a convex polytope. Also in this example, the solutions satisfying equation 13 with different $\alpha$'s are shown as dots in FIG. 4. It is also shown that these solutions lie inside the feasible region. As one reduces $\alpha$ from 1 to 0, the converged solutions points approach an extreme point of the feasible region. It turns out that this extreme point also maximizes the objective function given by equation 12. In general, although not all the $\alpha$'s would lie within the feasible region, we will provide a method to search the $\alpha$-space to optimize a particular objective function.

Optimization Algorithm

Figure 5:
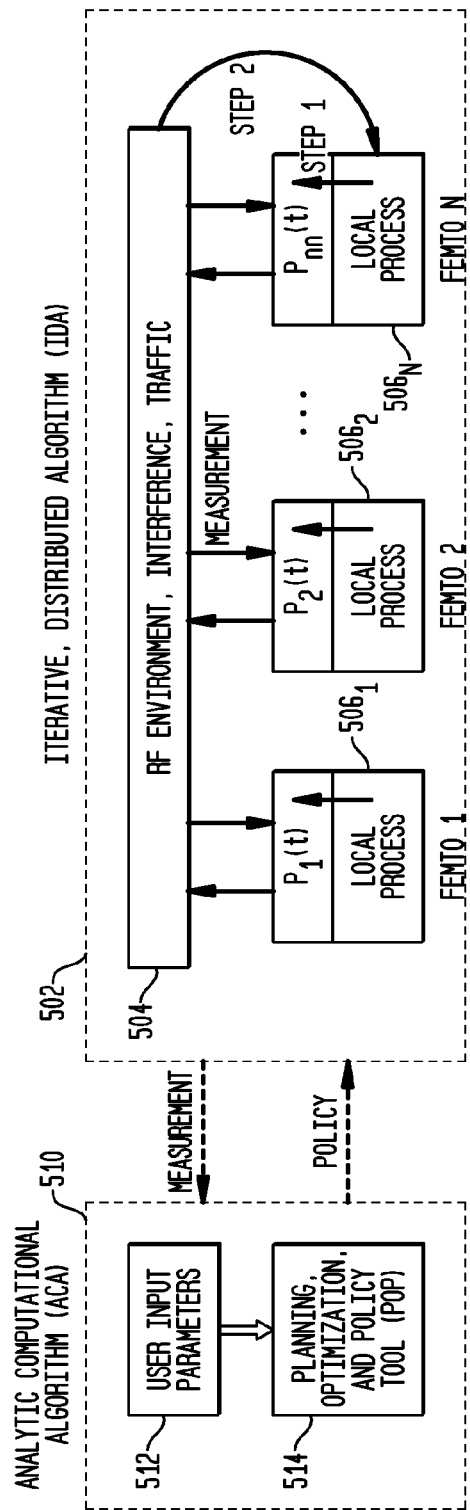
FIG. 5 is a schematic representation of a high-level optimization process.

The following is an algorithm for optimization based on the framework in equation 7 to equation 12 and the objective function given by equation 13. The overall architecture is shown in FIG. 5.

Iterative Distributed Algorithm

There are two closely related aspects of the algorithm. The first part is an Iterative Distributed Algorithm (IDA), which is intended to be executed inside the femtocells. The second part of the algorithm is intended to be used as a toolset and is called an Analytic Computational Algorithm (ACA), which is intended to be used in a centralized planning and operations center. The ACA provides a set of conditions that are used to check for convergence of the IDA. In the following, there is first a description of the IDA. Then there is a derivation of the ACA and show that various aspects of planning and analysis of IDA can be directly derived from the ACA.

The core of the iterative distributed algorithm can be conceptually described as a two-step process. The high-level idea of the algorithm is shown in the right side 502 of FIG. 5. The first step is a mathematical procedure associated with each femtocell. This "local" process obtains information from measurements or estimation regarding the RF environment, traffic, and external interference 504 for each femtocell 506. At instance time=t, each femo local process adjusts its own resource (power, $P_i(t)$) according to the input and some rules either predefined or downloaded remotely. The rules reflect global policies, which are controlled and set by a network policy planning server (not shown). Each adjustment of the local femto power is performed regularly (e.g. once every few minutes). However, femtocells are not required to synchronize for the local adjustments. After adjustment, each femtocell presents to the overall system its impact in the form of interference. After x seconds, the system goes into the second step, repeats the same local process, but with new input parameters. This second step can be conceptually considered to be an outer loop, which reiterates continuously. Thus the second step is effectively an implicit step; it is implemented by the local process of each femtocell.

Figure 6:
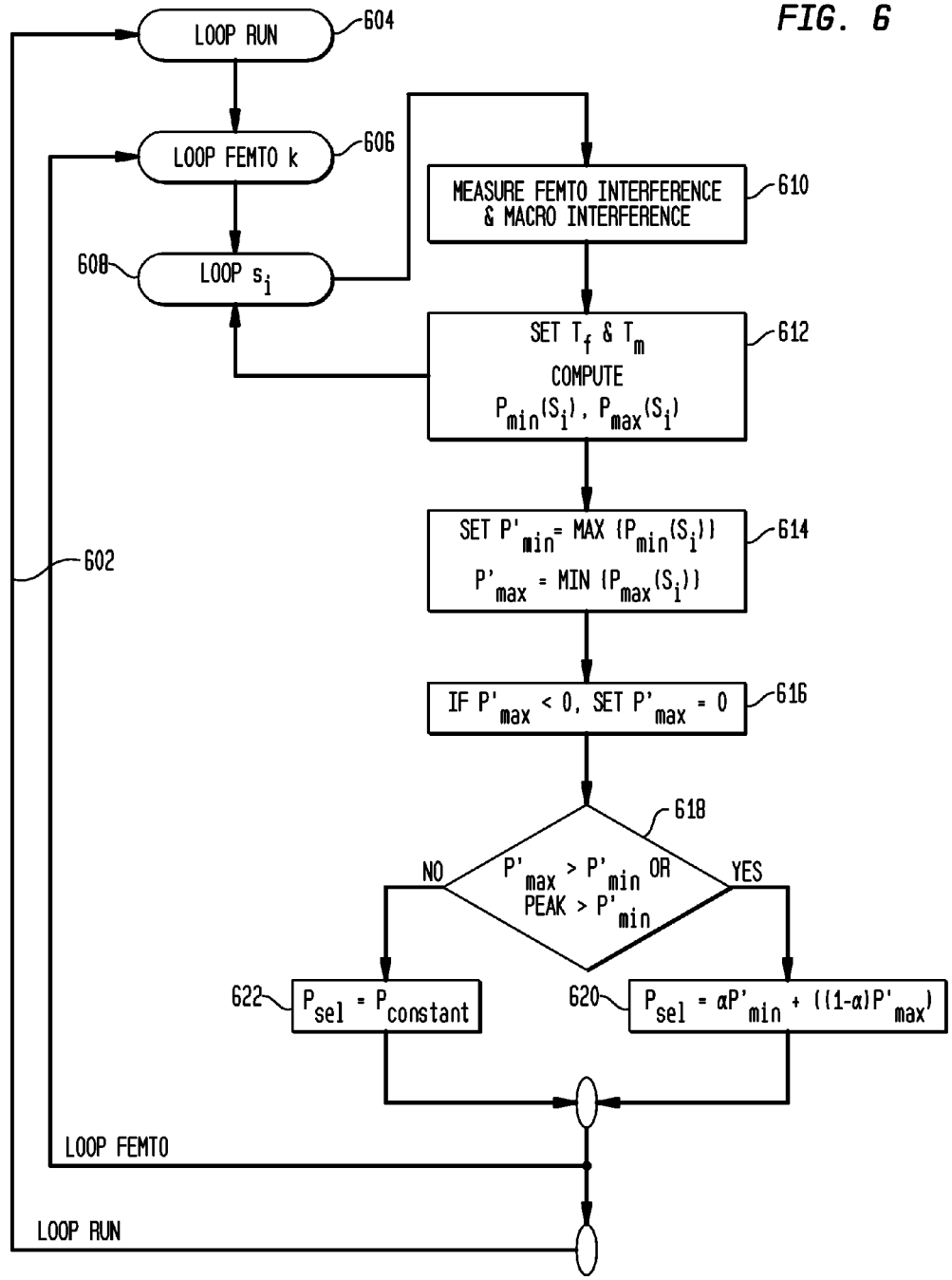
FIG. 6 is a flow chart of the IDA femto local optimization process.

FIG. 6 shows the flow chart of the femto local process. The algorithm involves 3 levels of iterations. At the outside loop 602, loop run corresponds to step 2 of FIG. 5, which affects all the femtocells. At each iteration (run) 604, loop femto 606 applies to each femtocell. Within each femto loop, loop si 608 applies to each HUE and corresponding MUE locations. Loop femto and loop si together implement step 1 of FIG. 5. The algorithm can start at any arbitrary initial power setting. At each iteration, each femtocell monitors the level of total interference 610, based on the RSRP (Reference Signal Received Power), and computes the $P_{min}(i)$ and $P_{max}(i)$ 612. Under a local feasible condition, defined as, $$P_{min}(i) < P_{max}(i) \quad \text{(eq. 18)}$$

femto i selects a power level of, $$P_i(sel) = \alpha P_{min}(i) + (1-\alpha) P_{max}(i) \quad \text{(eq. 19)}$$

at step 620. If the condition of step 618 is not met, then $P_i(sel) = P_{constant}$.

Note that the local feasible condition given by equation 18 is not necessary for all iterative steps for IDA to converge. However, when the local feasible condition of equation 18 is not satisfied, the femtocell will set the selected power to a predefined constant value of $P_{constant}$ if the condition of $P_{min} >$ Peak is also satisfied. The reason for this additional condition is to protect anomalous scenarios such as equipment failures or two femtocells placed at close proximity, which may cause other femtocells to react and thereby lead to unstable situations. A recommended range of values of $P_{constant}$ for a per resource block basis, is from −14 to −10 dBm and a recommended range for Peak is −8 to −5 dBm.

Implementation of IDA

The IDA described described above focuses on the algorithmic procedure from a systems and simulation viewpoint. Next, we present the IDA from the functional perspective of a femtocell, and it will be suitable to be used for femtocell implementation of the IDA.

Figure 7:
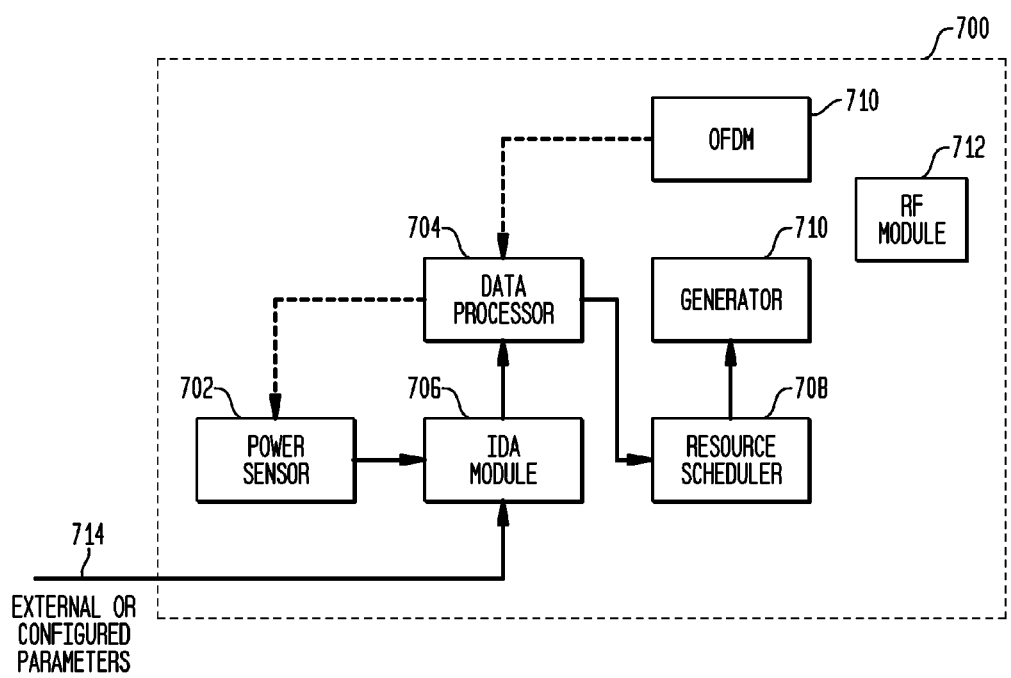
FIG. 7 is a schematic representation of femtocell implementation of IDA.

FIG. 7 shows the key components of a femtocell implementing the IDA. The implementation is consistent with the flow chart of FIG. 6. However, a few parameters may be estimated, rather than measured exactly as defined in FIG. 6 due to difficulties in practical implementations. For example, if a femtocell uses a built-in mechanism to measure the neighboring cells' powers (called the network listening mode), the si's would be estimated based on the measured location, which is where the femtocell is. If an UE-assisted measurement is used, which means that an UE is used to measure the neighboring powers, the algorithm will average the UE's measurements for the estimated neighboring cells' powers.

Referring to FIG. 7, the Power Sensor module 702 measures the power of the neighboring femtocells and the macrocells. One implementation of this is via the Reference Signal Received Power (RSRP) signal. The RSRP is defined in 3GPP. It is a Received Signal Strength Indicator (RSSI) type of measurement. It measures the average received power over the resource elements that carry cell-specific reference signals within certain frequency bandwidth. The RSRP provides one way to measure the quantities, $\Sigma_{j=1, i \neq j} P_j g_{ji}$, and $P_m g_{mil}$, of equation 9 and equation 10. The Power Sensor obtains the RSRP from the OFMA Decoder and the Data Processor 704. This information is then provided to the IDA Module 706, which computes $P_{min}(i)$ and $P_{max}(i)$, and $P_{sel}(i)$ for a specific iteration. $P_{sel}(i)$ is the main output of IDA Module, which is sent to the Data Processor 704. The Data Processor performs two functions: 1) instructs the Resource Scheduler 708 about $P_{sel}(i)$ for the current iteration, and 2) adjusts the RSRP for the appropriate resource element frequency, according to the new setting of $P_{sel}(i)$. The Resource Scheduler will use the newly selected power $P_{sel}(i)$ as a power constraint for a specific resource element frequency. Otherwise, its function is unchanged from that of regular (non-IDA) implementation. The OFDM Generator and Decoder 710, and the RF Module 712 are all regular components of a typical femtocell, with no additional change necessary for the implementation of the IDA. In addition to the received power of the neighboring femtocells and macrocells, the IDA Module also receives parameters 714 including the target FUE $SINR_f(T_f)$ and the target MUE $SINR_m$ ($T_m$), as well as the QoS parameter $\alpha$ for the computation of $P_{sel}(i)$. These parameters may be preconfigured to the femtocell, or it can dynamically be updated via a remote control channel as shown in FIG. 7.

Analytic Computational Algorithm (ACA)

Next, the analytical computational algorithm for solving the femtocell power optimization problem will be described. The same framework described for the IDA is used here. However, we shall show that the solution can be obtained by a direct analytical computation. We will also use the obtained result to analyze the convergence behavior and conditions of the iterative algorithm. The ACA is suitable for implementation in a centralized location rather than at a local femtocell.

As shown in the left side of FIG. 5, the ACA 510 is used as a tool for planning, optimization, and creation of global policy. The ACA works together with the IDA and forms a hybrid solution. ACA 510 takes parameter inputs from the user 512 and creates a set of best chosen parameters, which is used to configure the femto local policy via a planning, optimization, and policy management interface 514. Examples of the relevant parameters are given in Table 1. Once the system is in the operations mode, the femtocells 506 are monitored and the relevant attributes are reported back to the ACA. The ACA, when operated in the operations mode, receives input from the femtocell network and determines if the current settings need to be adjusted (a retuning process). In addition, if there are changes of policy or addition of new policy regarding user level policy and the ACA computation detect that new parameters need to be sent to the femto network, it will then push new settings into the femtocell network.

TABLE 1

Femtocell relevant parameters

| Parameter name | symbol | typical values |
|---|---|---|
| House radius | r | 10-20 m |
| Distance between femtos | D | 30 m |
| Indoor path gain model | $L_{femto}(dB) = 28 + 40 \log_{10}(d) - $ gain_femto | |
| Outdoor path gain model | $L_m(dB) = 128.1 + 37.6 \log_{10}(d_{km}) + L_{sh} - G_m$ | |
| LTE spectrum | BW | 10 MHz |
| Number of RB | nRB | 25 for 10 MHz spectrum |
| Noise per RB | $N_t$ | −109 dB |
| Femto antenna gain | Gain_femto | 0 dBi |
| Macro antenna gain | Gain_macro | 15 dBi |
| Total femto power | $P_i$ | <20 dBm |
| Total macro power | $P_m$ | 46 dBm |
| Femto-macro resource factor | α | 0-1 |
| Target HUE SINR | $T_f$ | 5 dB |
| Target MUE SINR | $T_m$ | 0-1 dB |
| Femtocell location | $f_i(x, y)$ | |
| Macro tower location | $M_i(x, y)$ | |
| Convergence matrix | K | |
| Number of femtocells | N | |

Based on the ACA, typical planning and "what-if" questions are:

Given femtocell locations, what are the range of $T_f$ and $T_m$ that can be supported?

Given femtocell locations, and QoS requirement, what is the smallest femto-femto distance that can be supported?

Does the local distributive algorithm converge? If not what parameters need to be relaxed to achieve convergence?

What QoS in the form of resource allocation (α's) to HUE and MUE can be supported?

The essence of the ACA is described and analyzed in the following.

We first rewrite equation 9 and equation 10, in matrix notation as:

$$P_i \geq \frac{T_f}{g_{fi}} \cdot [g_{1i} \ldots 0 \ldots g_{Ni}] \begin{bmatrix} P_1 \\ P_2 \\ \vdots \\ P_N \end{bmatrix} + \frac{T_f}{g_{fi}} \cdot (p_m g_{mil} + N_t) \triangleq P_{min}(i) \quad \text{(eq. 20)}$$

for $i = 1, \ldots N$ $$P_i \geq \frac{-1}{g_{fi}} \cdot [g'_{1i} \ldots 0 \ldots g'_{Ni}] \begin{bmatrix} P_1 \\ P_2 \\ \vdots \\ P_N \end{bmatrix} + \frac{1}{g_{fi}} \cdot \left( \frac{p_m g_{mi} O}{T_m} + N_t \right) \quad \text{(eq. 21)}$$

$$\triangleq P_{max}(i)$$

for $i = 1, \ldots N$

Notice that a "0" is inserted in the i-th position of the path gain row vectors. Equation 20 and equation 21 represent a total 2N inequalities. Each set of two inequalities gives the lower and upper power bound for femtocell i. The set of $P_i$'s that satisfies these 2N inequalities constitutes the feasible region. Applying equation 19 to each pair of these 2N bounds gives, $$P_i = \alpha \cdot \left\{ \frac{T_f}{g_{fi}} \cdot [g_{1i} g_{2i} \ldots 0 \ldots g_{Ni}] \begin{bmatrix} P_1 \\ P_2 \\ \vdots \\ P_N \end{bmatrix} \middle| \frac{T_f}{g_{fi}} \cdot (P_m g_{mil} | N_t) \right\} +$$

$$(1-\alpha) \cdot \left\{ \frac{-1}{g_{fi}} \cdot [g'_{1i} g'_{2i} \ldots 0 \ldots g'_{Ni}] \begin{bmatrix} P_1 \\ P_2 \\ \vdots \\ P_N \end{bmatrix} + \right.$$

$$\left. \frac{1}{g_{f2}} \cdot \left( \frac{p_m g_{mi} O}{T_m} + N_t \right) \right\} \text{ for } i = 1, \ldots N$$

eq. 22)

Define $\bar{h}_i^T \triangleq [g_{1i} g_{2i} \ldots 0 \ldots g_{Ni}]$, $\bar{h}_i'^T \triangleq [g'_{1i} g'_{2i} \ldots 0 \ldots, g'_{Ni}]$, and re-arranging equation 22, we obtain, $$P_i = \left[ \frac{\alpha T_f}{g_{fi}} \cdot \bar{h}_i^T - \frac{(1-\alpha)}{g_{fi}} \cdot \bar{h}_i'^T \right] \begin{bmatrix} P_1 \\ P_2 \\ \vdots \\ P_N \end{bmatrix} + \quad \text{(eq. 23)}$$

$$\left\{ \frac{\alpha T_f}{g_{fi}} \cdot (p_m g_{mil} + N_t) + \frac{(1-\alpha)}{g_{fi}} \cdot \left( \frac{p_m g_{mi} O}{T_m} + N_t \right) \right\}$$

for $i = 1, \ldots N$

Equation 22 or equation 23 describes a set of N equations. Using equation 22, we can represent the IDA power adjustment of femtocell i at iteration step t+1, as, $$\bar{P}(t+1) = \bar{K} \bar{P}(t) + \bar{C} \quad \text{(eq. 24)}$$

where $\bar{K}$ is a N×N matrix that depends on $\alpha$, and whose ij-th element, $k_{ij}(\alpha)$, is given by, $$k_{ij}(\alpha) = \begin{cases} \frac{\alpha T_f g_{ji}}{g_{fi}} - \frac{(1-\alpha)g'_{fi}}{g_{fi}}, & i \neq j \\ 0, & i = j \end{cases} \quad (\text{eq. 25})$$

for $i = 1, \ldots N$. $j = 1, \ldots, N$ $\bar{C}$ is a column vector, whose i-th element, $c_i(\alpha)$, is given by, $$c_i(\alpha) = \frac{\alpha T_f}{g_{fi}}(P_m g_{mil} + N_t) + \frac{(1-\alpha)}{g_{fi}}\left(\frac{P_m g_{mi} o}{T_m} + N_t\right) \quad (\text{eq. 26})$$

for $i + 1, \ldots N$.

and $\bar{P}(t) = [P_1(t) P_2(t) \ldots P_N(t)]^T$ is the power levels of the femtocells at instant t.

The matrix $\bar{K}$ captures a lot of information about the femtocell system including the path gains from femto i to j, with respect to both inside ($s_i$) and outside ($A_i$) the femtocell region, and the path gain from the femto source to the HUE at $s_i$. $\bar{K}$ also incorporates the QoS requirement with respect to $\alpha$ and the targeted SINR requirement for the femtocell. The vector $\bar{C}$, which also depends on $\alpha$, captures the information related to path gain from the tower to the femtos, as well as the targeted SINR for both femto- and macro-UE.

It should be noted that while equation 22 to equation 26 are written with constant $\alpha$, $T_m$, and $T_f$, all these parameters can be generalized to be a function of i, so that $\alpha \rightarrow \alpha_i$, $T_m \rightarrow T_{mi}$, $T_f \rightarrow T_{fi}$, signifying that these parameters can in general be different for different femtocells. Therefore different QoS's can be allocated to different femtocells. The same generalization also applies to the size and path gain model of the femtocell, which impacts the elements of $\bar{h}_i^T$ and $\bar{h}i^T$.

In IDA, the power vector changes for each iteration. However, if and when the system converges, such that the magnitude of the change of the power vector is smaller than some predefined constant $\epsilon$ we can drop the reference to t and write power vector as $\bar{P}_{sol}$. Denote I as an N×N Identity matrix, eq. 24 can be written as, $$\bar{P}_{sol} = \bar{K}\bar{P}_{sol} + \bar{C} \quad (\text{eq. 27a})$$

$$\Rightarrow \bar{P}_{sol} = (I-\bar{K})^{-1}\bar{C} \quad (\text{eq. 27b})$$

Therefore, a unique solution for $\bar{P}_{sol}$ exists if $(I-\bar{K})^{-1}$ exists. It should be quite straightforward to check if the inverse exists once $\bar{K}$ is known. However, it should be noted that the solution given by equation 27b does not guarantee that it is inside the feasible region described by equation 9 to equation 11. One way to see if $\bar{P}_{sol}$ satisfies feasibility is to check if it falls between the vectors $\bar{P}_{min}(\alpha)$ and $\bar{P}_{max}(\alpha)$ for all i. $\bar{P}_{min}(\alpha)$ can be obtained by setting $\alpha=1$ in equation 23 and equation 25, and using equation 27a, such that, $$\bar{P}_{min}(\alpha) = \bar{K}(\alpha=1)\bar{P}_{sol}(\alpha) + \bar{C}(\alpha=1) \quad (\text{eq. 28})$$

Similarly, we can obtain $\bar{P}_{max}$ by setting $\alpha=0$ in equation 23 and equation 25, and from equation 27a, we have, $$\bar{P}_{max}(\alpha) = \bar{K}(\alpha=0)\bar{P}_{sol}(\alpha) + \bar{C}(\alpha=0) \quad (\text{eq. 29})$$

If $\bar{P}_{min}(i) \leq \bar{P}_{sol}(i) \leq \bar{P}max(i)$ for all i, then $\bar{P}_{sol}(\alpha)$ is feasible, otherwise it is not.

The ACA thus provides a simple and efficient method to obtain a set of solution powers for the femtocells such that the target SINR's certain QoS requirements are satisfied.

Conditions for Convergence

From equation 19 and equation 24, we have now derived two methods to obtain the solution to the femto power adaptation problem. To implement equation 24, it requires the complete knowledge of the $\bar{K}$ matrix and $\bar{C}$ vector, which normally won't be available in a local femtocell. However, such knowledge can be obtained in a centralized entity. Therefore the solution given in equation 24 is suitable for centralized implementation. Two algorithms lead to the same solution under suitable conditions. We will prove this assertion as follows.

Rewrite equation 24 using subscript t in $\bar{P}_t$ to denote the t-th iteration of the IDA. The IDA process can be written as a difference equation, $$\bar{P}_{t+1} = \bar{K}\bar{P}_t + \bar{C} \quad (\text{eq. 30})$$

Using equation 24 and equation 30, the difference between the current powers at iteration t+1 and the final converged powers is given by, $$\bar{P}_{t+1} - \bar{P}_{sol} = (\bar{K}\bar{P}_t + \bar{C}) - (\bar{K}\bar{P}_{sol} + \bar{C}) = \bar{K}(\bar{P}_t - \bar{P}_{sol}) \quad (\text{eq. 32})$$

The IDA can be described as iteratively applying equation 30 for t+2, t+3, t+L, which gives, $$\Rightarrow \bar{P}_{t+L} - \bar{P}_{sol} = \bar{K}^L(\bar{P}_t - \bar{P}_{sol}) \quad (\text{eq. 32})$$

Using the $l_2$ norm of a vector, $\|.\|$ as a metric to measure how far the result after L-th iteration is to the final solution $\bar{P}_{sol}$, we have, $$\|\bar{P}_{t+L} - \bar{P}_{sol}\| = \|\bar{K}^L(\bar{P}_t - \bar{P}_{sol})\| \quad (\text{eq. 33})$$

$$= \|(\bar{P}_t - \bar{P}_{sol})\| \cdot \left\|(\bar{K}^L)\frac{(\bar{P}_t - \bar{P}_{sol})}{\|(\bar{P}_t - \bar{P}_{sol})\|}\right\|$$

$$\leq \|(\bar{P}_t \ \bar{P}_{sol})\| \cdot \|(\bar{K}^L)\|$$

The last bound (inequality) follows directly from the definition of $l_2$ norm of a matrix. Putting t=0, we obtain, $$\|\bar{P}_L - \bar{P}_{sol}\| \leq \|(\bar{P}_0 - \bar{P}_{sol})\| \cdot \|(\bar{K}^L)\| \quad (\text{eq. 34})$$

Theorem 1 says that If $\max(\|\bar{K}_1\|, \|\bar{K}_2\|) < 1$, then $\|\bar{K}_\alpha\| < 1$, for all $\alpha$.

From Theorem 1, we have if $\max(\|\bar{K}_1\|, \|\bar{K}_2\|) < 1$, then $\|\bar{K}_\alpha\| < 1$, for all $\alpha$.

Since, $$\|(\bar{K}^L)\| \leq \|\bar{K}\|^L \quad (\text{eq. 35})$$

we have $\|(\bar{K}^L)\| \rightarrow 0$ if $L \rightarrow \infty$

We conclude that the right side of equation 34 vanishes for large L, which implies that IDA will result in a $\bar{P}_L$ that approaches to the solution vector $\bar{P}_{sol}$.

Various aspects of the present disclosure may be embodied as a program, software, or computer instructions embodied in a computer or machine usable or readable device, which causes the computer or machine to perform the steps of the method when executed on the computer, processor, and/or machine.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

While there has been described and illustrated a system and method for optimizing LTE femtocell performance, it will be apparent to those skilled in the art that variations and modifications are possible without deviating from the broad teachings of the present invention which shall be limited solely by the scope of the claims appended hereto.

What is claimed is:

1. A method of optimizing performance of femtocells in a long term evolution femtocell network of femtocells comprising the steps of:
   (a) providing global policy rules for the network;
   (b) providing a predetermined QoS parameterized by α, where α is in a range of values such that the power adjustment of the femtocell network is stable and converges and α has values between 0 and 1;
   (c) each femtocell in the network independently processing information from measurements or estimations of parameters and the value α, for each femtocell;
   (d) each femtocell periodically adjusting its resources according to the processed information and the rules; and
   (e) repeating step (c) and step (d) with new parameters until the value of α is met for the network.

2. The method of claim 1, wherein the parameters comprise at least one of environment, traffic and external interference.

3. The method of claim 1 wherein the parameter α is set for each femtocell.

4. The method of claim 1, wherein when a femtocell is added to the network or moved within the network resulting in a failure to provide a converged solution, step (e) repeats until new parameters result in an absence of large scale instability.

5. The method of claim 1, wherein step (e) repeats until there is a region of stable operation with respect to a range of parameters.

6. A system for optimizing performance of femtocells in a long term evolution femtocell network of femtocells comprising:
   a data processor providing data to a power sensor module and to a resource scheduler;
   a power sensor module for measuring the power of neighboring femtocells and macrocells and providing an input to an iterative distributed algorithm (IDA) module the IDA module receiving parameters as an input for performing measurements for each iteration of an optimization process;
   resource scheduler receiving selected femtocell power level ($P_{sel}(i)$) and resource element frequency instructions from said data processor for the current iteration and using $P_{sel}(i)$ as a power constraint for a specific resource element frequency; and
   a generator receiving the power constraint information from the resource scheduler for adjusting the power of the femtocell.

7. The system for optimizing performance of femtocells in a long term evolution femtocell network of femtocells as set forth in claim 6, wherein the IDA module computes minimum femtocell power level $P_{min}(i)$, maximum femtocell power level $P_{max}(i)$, and $P_{sel}(i)$ for a specific iteration.

8. The system for optimizing performance of femtocells in a long term evolution femtocell network of femtocells as set forth in claim 6, wherein the IDA module further receives parameters including the target femto user equipment (FUE) signal-to-interference-and-noise ($SINR_f(T_f)$), the target macro user equipment (MUE) signal-to-interference-and noise $SINR_m(T_m)$ and the value of a for computation of $P_{sel}(i)$.

9. The system for optimizing performance of femtocells in a long term evolution femtocell network of femtocells as set forth in claim 6, wherein the resource scheduler adjusts the reference signal received power (RSRP) for the resource element frequency according to the new setting of $P_{sel}(i)$.

* * * * *

UNITED STATES PATENT AND TRADEMARK OFFICE
CERTIFICATE OF CORRECTION

PATENT NO. : 8,874,101 B2
APPLICATION NO. : 12/984276
DATED : October 28, 2014
INVENTOR(S) : Lau It is certified that error appears in the above-identified patent and that said Letters Patent is hereby corrected as shown below:

In the Drawings

In Fig. 5, Sheet 4 of 6, delete "ITERATIVE," and insert -- ITERATIVE --, therefor.

In the Specification

In Column 3, Line 21, delete "HUES" and insert -- HUEs --, therefor.

In Column 7, Line 14, delete "$T_j$" and insert -- $T_f$ --, therefor.

In Column 7, Line 25, in Equation "(eq. 8)", delete "$\sum_{j=2, i \neq j}^{N}$" and insert -- $\sum_{j=2, i \neq j}^{N}$ --, therefor.

In Column 8, Lines 31-32, delete "$P_1 \geq \left(\frac{T_f}{g_2}\right)(P_2 g_2' + P_m g_{m11})$" and insert -- $P_1 \geq \left(\frac{T_f}{g_1}\right)(P_2 g_2' + P_m g_{m11})$ --, therefor.

In Column 9, Line 25, delete "femo" and insert -- femto --, therefor.

Signed and Sealed this
Twenty-fifth Day of August, 2015

Michelle K. Lee
*Director of the United States Patent and Trademark Office*

CERTIFICATE OF CORRECTION (continued)
U.S. Pat. No. 8,874,101 B2

In Column 10, Line 30, delete "$, \sum_{j=1}$" and insert --$, \sum_{j=1}^{N}$--, therefor.

In Column 13, Line 63, delete "Pmax" and insert --$P_{max}$--, therefor.

In Column 14, Line 38, in Equation "(eq. 33)", delete "$\leq \|(\overline{P}_t \ \overline{P}_{sol})\| \cdot \|(\overline{K}^L)\|$" and insert --$\leq \|(\overline{P}_t - \overline{P}_{sol})\| \cdot \|(\overline{K}^L)\|$--, therefor.